(12) United States Patent
Auslender et al.

(10) Patent No.: US 11,621,752 B1
(45) Date of Patent: Apr. 4, 2023

(54) TRANSMIT POWER VIOLATION PROTECTION MECHANISM IN A RADIO UNIT OF A DISAGGREGATED BASE STATION

(71) Applicant: QUALCOMM Incorporated, San Diego, CA (US)

(72) Inventors: Ori Auslender, San Diego, CA (US); Christian Oliver Thelen, San Diego, CA (US); Afshin Shiravi, San Jose, CA (US); Mark Wallace, Bedford, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/656,706

(22) Filed: Mar. 28, 2022

(51) Int. Cl.
*H04B 7/0456* (2017.01)
*H04B 7/0426* (2017.01)
*H04W 52/30* (2009.01)

(52) U.S. Cl.
CPC .......... *H04B 7/0465* (2013.01); *H04B 7/043* (2013.01); *H04W 52/30* (2013.01)

(58) Field of Classification Search
CPC ...... H04B 7/046; H04B 7/0465; H04B 7/043; H04B 2001/0408–0441; H04B 2001/045; H04W 52/16; H04W 52/18; H04W 52/30; H04W 88/08; H04W 88/085
See application file for complete search history.

(56) References Cited

U.S. PATENT DOCUMENTS

| | | | | |
|---|---|---|---|---|
| 6,473,467 B1* | 10/2002 | Wallace | ............... | H04B 7/0626 375/267 |
| 6,940,917 B2* | 9/2005 | Menon | ............... | H01Q 3/26 375/267 |
| 7,194,040 B2* | 3/2007 | Menon | ............... | H04B 7/0417 375/260 |
| 7,302,009 B2* | 11/2007 | Walton | ............... | H04L 25/0204 375/267 |
| 7,899,131 B2* | 3/2011 | Walton | ............... | H04L 25/03866 375/267 |
| 7,907,689 B2* | 3/2011 | Walton | ............... | H04B 7/043 375/267 |
| 8,102,944 B2* | 1/2012 | Wallace | ............... | H04B 7/043 375/316 |
| 8,218,609 B2* | 7/2012 | Walton | ............... | H04L 27/2602 375/377 |

(Continued)

*Primary Examiner* — James M Perez
(74) *Attorney, Agent, or Firm* — Harrity & Harrity, LLP\Qualcomm

(57) ABSTRACT

This disclosure provides systems, methods and apparatuses for protecting against transmit power violations in a radio unit (RU) of a disaggregated base station. For example, when a distributed unit (DU) provides frequency domain samples to the RU, the DU may set a reference input level that causes the RU scale a gain lineup to avoid saturation or sensitivity issues in a signal processing chain while ramping up to a required transmit power. Accordingly, to avoid signal saturation or clipping at the RU, the RU may monitor energy estimation measurements and take remedial action when a transmit power violation occurs. For example, the RU may provide one or more system alarms to the DU or prevent transmission over an air interface in cases where the energy estimation measurements fail to satisfy one or more thresholds.

20 Claims, 6 Drawing Sheets

(56) References Cited

U.S. PATENT DOCUMENTS

| | | | |
|---|---|---|---|
| 8,615,053 B2* | 12/2013 | Wallace | H04B 7/043 375/267 |
| 10,142,082 B1* | 11/2018 | Shattil | H04L 27/26134 |
| 10,917,905 B2* | 2/2021 | Zhang | H04W 74/0816 |
| 11,184,037 B1* | 11/2021 | Shattil | H04B 1/0003 |
| 11,510,147 B2* | 11/2022 | Balasubramanian | H04W 24/10 |
| 2004/0042439 A1* | 3/2004 | Menon | H04B 7/0634 370/208 |
| 2004/0120411 A1* | 6/2004 | Walton | H04B 7/0417 375/260 |
| 2005/0157806 A1* | 7/2005 | Walton | H04B 7/043 375/267 |
| 2006/0104381 A1* | 5/2006 | Menon | H04L 25/0204 375/267 |
| 2008/0031372 A1* | 2/2008 | Walton | H04L 25/0224 375/260 |
| 2008/0031374 A1* | 2/2008 | Walton | H04B 7/0615 375/267 |
| 2008/0285664 A1* | 11/2008 | Wallace | H04B 7/043 375/260 |
| 2012/0033618 A1* | 2/2012 | Wallace | H04L 1/0002 370/328 |
| 2015/0244430 A1* | 8/2015 | Shattil | H04L 41/0816 370/254 |
| 2017/0214440 A1* | 7/2017 | Mao | H04B 7/0865 |
| 2017/0257155 A1* | 9/2017 | Liang | H04B 7/0456 |
| 2017/0303118 A1* | 10/2017 | Ahmed | H04W 24/02 |
| 2018/0020487 A1* | 1/2018 | Tsai | H04W 74/004 |
| 2018/0048442 A1* | 2/2018 | Sang | H04B 7/0695 |
| 2018/0234197 A1* | 8/2018 | John Wilson | H04J 11/0079 |
| 2018/0242160 A1* | 8/2018 | Morita | H04W 16/08 |
| 2018/0343646 A1* | 11/2018 | Chou | H04W 16/14 |
| 2019/0104481 A1* | 4/2019 | Olsson | H04L 47/125 |
| 2019/0116568 A1* | 4/2019 | Fertonani | H04W 56/0045 |
| 2019/0132096 A1* | 5/2019 | Abedini | H04W 52/46 |
| 2019/0132805 A1* | 5/2019 | Abedini | H04W 52/46 |
| 2019/0159100 A1* | 5/2019 | Liou | H04L 1/0025 |
| 2019/0253106 A1* | 8/2019 | Raghavan | H04B 17/382 |
| 2019/0274169 A1* | 9/2019 | Tsai | H04W 56/003 |
| 2019/0342798 A1* | 11/2019 | Raghothaman | H04W 92/04 |
| 2019/0364492 A1* | 11/2019 | Azizi | H04W 52/0261 |
| 2020/0029297 A1* | 1/2020 | Baek | H04W 76/11 |
| 2020/0059931 A1* | 2/2020 | Hannan | H04B 17/318 |
| 2020/0068493 A1* | 2/2020 | Ding | H04W 52/365 |
| 2020/0145967 A1* | 5/2020 | Park | H04W 72/042 |
| 2020/0153543 A1* | 5/2020 | Khoshnevisan | H04L 1/0026 |
| 2020/0228267 A1* | 7/2020 | Park | H04B 7/0639 |
| 2020/0252847 A1* | 8/2020 | Park | H04W 36/08 |
| 2020/0373950 A1* | 11/2020 | Cai | H03F 1/0222 |
| 2021/0120505 A1* | 4/2021 | Awoniyi-Oteri | H04W 36/18 |
| 2021/0195674 A1* | 6/2021 | Park | H04B 7/15542 |
| 2021/0195675 A1* | 6/2021 | Park | H04W 88/14 |
| 2021/0273747 A1* | 9/2021 | MacKenzie | H04W 28/0967 |
| 2021/0298000 A1* | 9/2021 | Park | H04L 5/0098 |
| 2022/0052861 A1* | 2/2022 | Kim | H04L 12/185 |
| 2022/0095160 A1* | 3/2022 | Thelen | H04L 27/261 |
| 2022/0158734 A1* | 5/2022 | Lee | H04J 14/0221 |
| 2022/0200669 A1* | 6/2022 | Banuli Nanje Gowda | H04B 7/0456 |
| 2022/0224366 A1* | 7/2022 | Steigert | H04B 1/18 |
| 2022/0255688 A1* | 8/2022 | Radulescu | H04L 5/0032 |
| 2022/0279535 A1* | 9/2022 | Tsui | H04L 43/16 |
| 2022/0311503 A1* | 9/2022 | Islam | H04B 7/15528 |
| 2022/0346150 A1* | 10/2022 | Sridharan | H04W 74/0833 |
| 2022/0368437 A1* | 11/2022 | Abedini | H04B 7/2606 |
| 2022/0376851 A1* | 11/2022 | Noh | H04L 5/0073 |

* cited by examiner

TRANSMIT POWER VIOLATION PROTECTION MECHANISM IN A RADIO UNIT OF A DISAGGREGATED BASE STATION

TECHNICAL FIELD

Aspects of the present disclosure relate generally to wireless communication and to techniques associated with a transmit (Tx) power violation protection mechanism in a radio unit (RU) of a disaggregated base station.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a radio unit (RU). The method may include receiving, from a distributed unit (DU) via a fronthaul interface, one or more frequency domain samples; performing an energy estimation measurement associated with transmitting, over an air interface, one or more time domain samples that correspond to the one or more frequency domain samples based on control information associated with the one or more frequency domain samples; and providing, to the DU via the fronthaul interface, one or more system alarms to indicate a transmit power violation based on the energy estimation measurement failing to satisfy one or more thresholds.

In some aspects, the one or more thresholds can include at least one minor threshold associated with raising the one or more system alarms and at least one major threshold associated with preventing transmission of the one or more time domain samples in addition to raising the one or more system alarms. In some aspects, the method can include transmitting the one or more time domain samples over the air interface based on the energy estimation measurement failing to satisfy the at least one minor threshold and satisfying the at least one major threshold. In some aspects, the method can include preventing transmission of the one or more time domain samples over the air interface based on the energy estimation measurement failing to satisfy the at least one minor threshold and failing to satisfy the at least one major threshold.

Another innovative aspect of the subject matter described in this disclosure can be implemented in an apparatus of an RU for wireless communication. The apparatus may include one or more interfaces configured to obtain, from a DU, one or more frequency domain samples. The apparatus may include a processing system configured to perform an energy estimation measurement associated with transmitting one or more time domain samples that correspond to the one or more frequency domain samples based on control information associated with the one or more frequency domain samples. The one or more interfaces may be configured to output, to the DU, one or more system alarms to indicate a transmit power violation based on the energy estimation measurement failing to satisfy one or more thresholds.

Another innovative aspect of the subject matter described in this disclosure can be implemented in a non-transitory computer-readable medium. The non-transitory computer-readable medium may store one or more instructions for wireless communication. The one or more instructions, when executed by one or more processors of an RU, may cause the one or more processors to receive, from a DU via a fronthaul interface, one or more frequency domain samples; perform an energy estimation measurement associated with transmitting, over an air interface, one or more time domain samples that correspond to the one or more frequency domain samples based on control information associated with the one or more frequency domain samples; and provide, to the DU via the fronthaul interface, one or more system alarms to indicate a transmit power violation based on the energy estimation measurement failing to satisfy one or more thresholds.

Another innovative aspect of the subject matter described in this disclosure can be implemented in an apparatus for wireless communication. The apparatus may include means for receiving, from a DU via a fronthaul interface, one or more frequency domain samples; means for performing an energy estimation measurement associated with transmitting, over an air interface, one or more time domain samples that correspond to the one or more frequency domain samples based on control information associated with the one or more frequency domain samples; and means for providing, to the DU via the fronthaul interface, one or more system alarms to indicate a transmit power violation based on the energy estimation measurement failing to satisfy one or more thresholds.

Aspects generally include a method, apparatus, system, computer program product, non-transitory computer-readable medium, user equipment, base station, central unit, distributed unit, radio unit, wireless communication device, or processing system as substantially described herein with reference to and as illustrated by the accompanying drawings.

Details of one or more implementations of the subject matter described in this disclosure are set forth in the accompanying drawings and the description. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
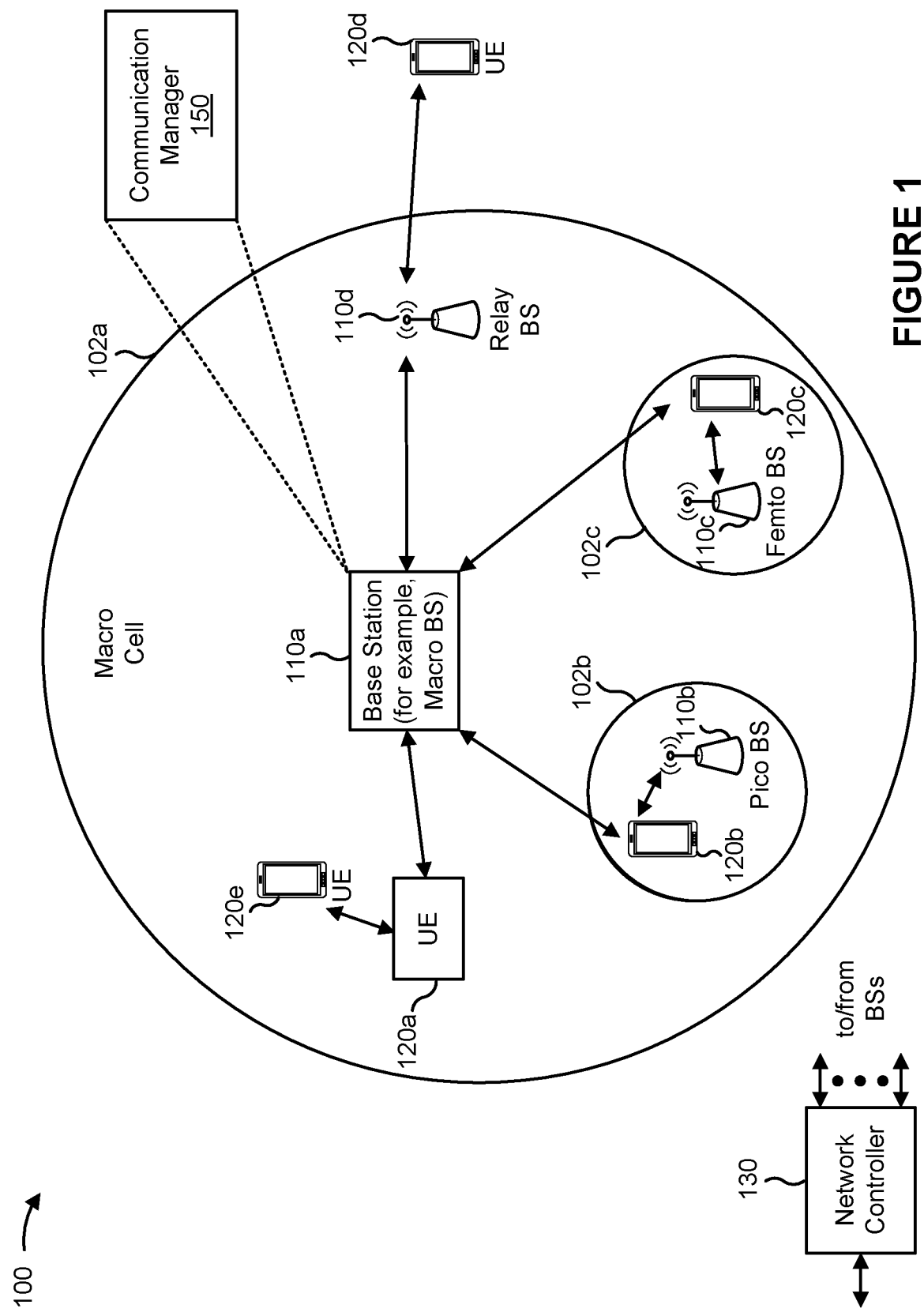
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G technology, 4G technology, 5G technology, or further implementations thereof.

As described herein, a wireless network may include one or more base stations that have a disaggregated architecture based on a lower layer functional split (for example, Split 7-2x defined by the Third Generation Partnership Project (3GPP)). For example, the lower layer functional split may separate base station functionality into a distributed unit (DU) and a radio unit (RU) that communicate over a fronthaul interface, where the DU corresponds to a logical unit or a logical node that controls the operation of one or more RUs, which generally correspond to logical units or logical nodes that host radio frequency (RF) processing functions or lower physical (PHY) layer functions to handle over-the-air (OTA) communication with one or more UEs. For example, on a downlink, OFDM phase compensation, inverse fast Fourier transform (iFFT), cyclic prefix (CP) addition, and digital beamforming functions reside in the RU, and remaining PHY functions including resource element (RE) mapping, layer mapping, modulation, scrambling, rate matching, and coding reside in the DU, with precoding residing in either the RU or the DU (for example, depending on the capabilities or configuration of the RU or the DU).

In general, when a DU controls the operation of an RU on a downlink, the DU may provide a control-plane message to the RU via a fronthaul interface to indicate control information associated with a downlink transmission (for example, scheduling information for a physical downlink control channel (PDCCH), a physical downlink shared channel (PDSCH), or another suitable downlink transmission) and may further provide, to the RU via the fronthaul interface, a user-plane message that includes in-phase/quadrature (IQ) data samples in an FFT frequency domain. The RU then performs an iFFT (among other functions) to convert the IQ data samples from the frequency domain to a time domain and transmits the time domain data samples to one or more UEs over an air interface based on the control information. Accordingly, in a disaggregated base station architecture where a DU controls an RU over a fronthaul interface, the DU is configured to generate downlink IQ data samples that the RU eventually transmits over the air interface to one or more UEs, which essentially disconnects the data generation entity (the DU) and the actual transmission entity (the RU). Furthermore, the disaggregated base station architecture may support massive multiple-input multiple-output (MIMO) antenna technologies, where the DU can define beamforming weights that the RU is to apply when transmitting over the air interface.

In some cases, allowing the DU to set beamforming weights and other transmission parameters applied at the RU may lead to signal saturation, clipping, or other adverse conditions at the RU (for example, in cases where the DU miscalculates the beamforming weights). For example, when the DU transfers IQ data samples to the RU, the IQ data samples may be associated with a reference input power level (for example, an IQ power level in decibels full scale (dBFS) that logarithmically represents the power level for an IQ sample carried over the fronthaul interface). Based on the reference input power level, the RU scales a gain lineup in a signal processing chain (for example, a transmit (Tx) path that includes one or more power amplifiers, filters, mixers, or other suitable components) to reach a required Tx antenna power. For example, in some cases, the control information provided by the DU may indicate an RF output power level to be used for a transmission over the air interface in decibel-milliwatts (dBm) (for example, at an RF reference plane to an assumed lossless antenna). The RU then determines the downlink gain to be achieved in the Tx path as the difference between the RF output level and the reference input power level, and performs digital power scaling to set the gain lineup to avoid saturation or sensitivity issues in any part of the signal processing chain while ramping up to the required output power level (for example, a required Tx antenna power).

Although the DU is generally responsible to scale the reference input power level of the IQ data samples sent over the fronthaul interface to avoid saturation in the RU, there are some cases where the DU may send data that will lead to signal saturation, clipping, or distortion at the RU. For example, signal saturation, clipping, or distortion may occur at the RU in cases where the DU sends IQ data samples with a higher reference input power level (for example, a reference input power level that exceeds a capability of the RU) due to a misconfiguration or failure, or in cases where the DU misconfigures beamforming weights in a way that leads to saturation in one or more ports, among other examples. In such cases, the signal saturation, clipping, or distortion may have destructive implications, such as degrading an error vector magnitude (EVM) for the transmitted signal and thereby degrading performance for UEs connected to the RU, causing out-of-band emissions that may increase an adjacent channel leakage ratio (ACLR) or otherwise violate one or more requirements associated with transmitting over the air interface (for example, defined by one or more wireless communication standards, such as 3GPP, or a regulatory body, such as the Federal Communication Commission), or risking physical damage to the hardware components of the RU (for example, the power amplifier), among other examples.

Some aspects described herein relate to systems, methods, apparatuses, or techniques to protect against Tx power violations in an RU of a disaggregated base station. For example, when a DU provides IQ frequency domain samples to the RU, the DU may set a reference input level that causes the RU to scale a gain lineup to ramp up to a required transmit power. Accordingly, to avoid signal saturation, clipping, or distortion at the RU, the RU may monitor energy estimation measurements within a Tx signal processing chain and take remedial action when a transmit power violation occurs. For example, the RU may provide one or more system alarms to the DU or prevent transmission over the air interface in cases where the energy estimation measurements fail to satisfy one or more thresholds. Furthermore, in cases where the RU includes multiple Tx ports and/or multiple Tx antennas, the Tx power violation protection techniques described herein may be used separately on a per-Tx port and/or per-Tx antenna basis. For example, the RU may monitor the energy estimation measurements associated with each Tx port and/or Tx antenna and may send the system alarms to the DU and/or prevent transmission on a per-port and/or per-antenna basis.

Particular implementations of the subject matter described in this disclosure can be implemented to realize one or more of the following potential advantages. In some cases, the Tx power violation protection mechanism described herein may be used in decentralized or disaggregated base station architectures to detect and prevent signal saturation in an RU or outliers or anomalies in DU behavior. Furthermore, detecting and preventing Tx power violations in the RU may improve the quality (for example, the EVM) of signals transmitted by the RU, reduce out-of-band emissions, reduce the risk of physical damage to hardware components in the RU, or otherwise maintain high quality downlink (transmission) performance by the RU. Furthermore, in cases where the RU provides one or more system alarms to the DU to indicate when a Tx power violation has occurred, the one or more system alarms may provide the DU with information that can be used to detect or remedy issues that may have caused the Tx power violation (for example, a failure or misconfiguration of the reference input power level to the RU or the beamforming weights to be applied at the RU).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network entities, such as one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an example of a network entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells.

In some examples, a cell may not necessarily be stationary, and the geographic area of the cell may move according to the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (for example, base station 110), or one or more units (or one or more components) performing base station functionality, may be implemented in an aggregated or disaggregated architecture. For example, a BS (such as a Node B (NB), eNB, NR BS, 5G NB, access point (AP), a TRP, or a cell) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, the DU, and the RU also can be implemented as virtual units, such as a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN), also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Accordingly, as described herein, the term "base station" (for example, the base station 110) or "network node" or "network entity" may refer to an aggregated base station, a disaggregated base station, an integrated access and backhaul (IAB) node, a relay node, or one or more components thereof. For example, in some aspects, the term "base station," "network node," or "network entity" may refer to a CU, a DU, an RU, a Near-Real Time (Near-RT) RAN Intelligent Controller (RIC), a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to multiple devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

In some aspects, the base station 110 may include a communication manager 150. As described in more detail elsewhere herein, the communication manager 150 may be associated with an RU and may receive, from a DU via a fronthaul interface, one or more frequency domain samples; perform an energy estimation measurement associated with transmitting, over an air interface, one or more time domain samples that correspond to the one or more frequency domain samples based on control information associated with the one or more frequency domain samples; and provide, to the DU via the fronthaul interface, one or more system alarms to indicate a transmit power violation based on the energy estimation measurement failing to satisfy one or more thresholds. Additionally, or alternatively, the communication manager 150 may perform one or more other operations described herein.

Figure 2:
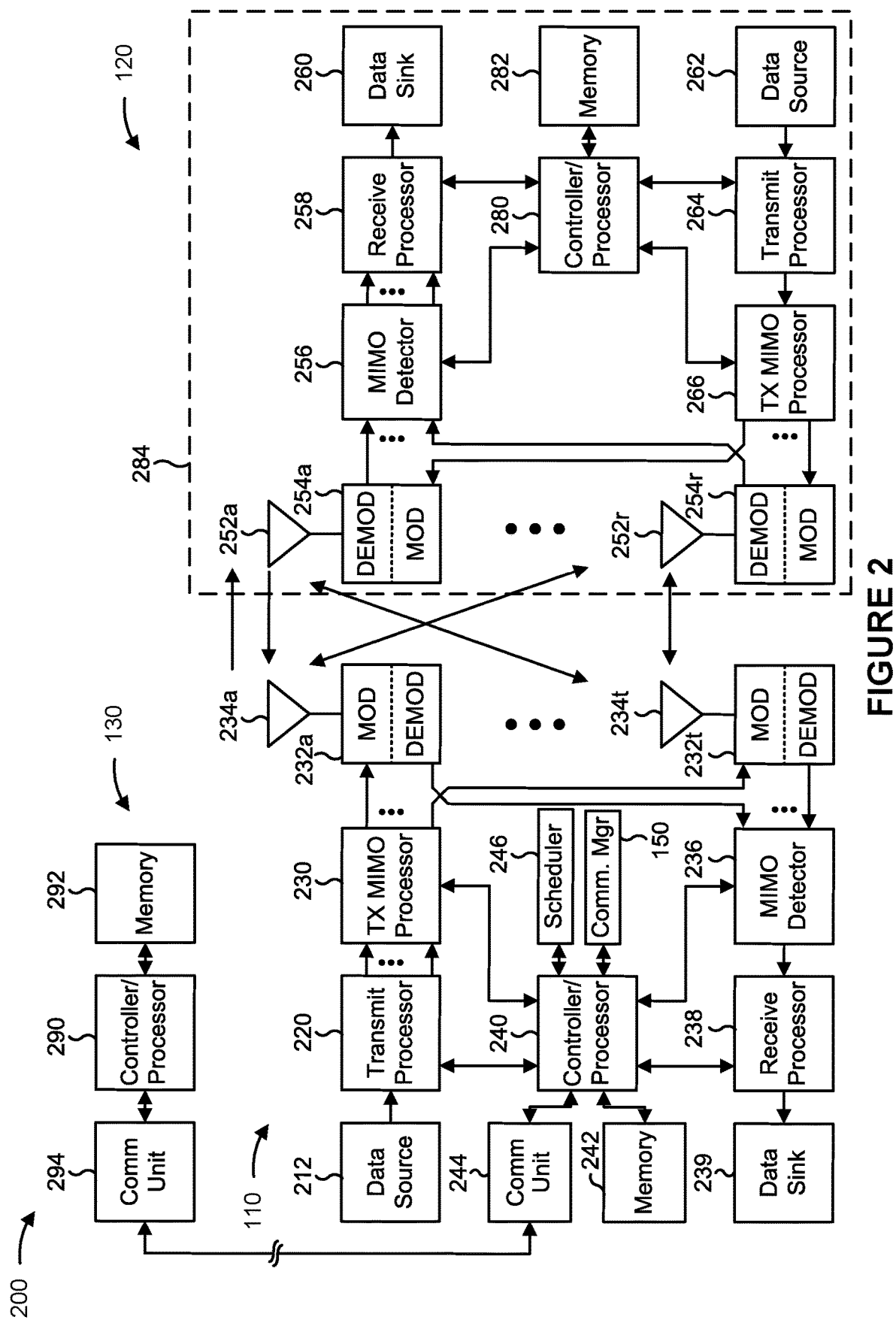
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The base station 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

In some aspects, the controller/processor 240 may be a component of a processing system. A processing system may generally be a system or a series of machines or components that receives inputs and processes the inputs to produce a set of outputs (which may be passed to other systems or components of, for example, the base station 110). For example, a processing system of the base station 110 may be a system that includes the various other components or subcomponents of the base station 110.

The processing system of the base station 110 may interface with one or more other components of the base station 110, may process information received from one or more other components (such as inputs or signals), or may output information to one or more other components. For example, a chip or modem of the base station 110 may include a processing system, a first interface to receive or obtain information, and a second interface to output, transmit, or provide information. In some examples, the first interface may be an interface between the processing system of the chip or modem and a receiver, such that the base station 110 may receive information or signal inputs, and the information may be passed to the processing system. In some examples, the second interface may be an interface between the processing system of the chip or modem and a transmitter, such that the base station 110 may transmit information output from the chip or modem. A person having ordinary skill in the art will readily recognize that the second interface also may obtain or receive information or signal inputs, and the first interface also may output, transmit, or provide information.

The controller/processor 240 of the base station 110, the controller/processor 280 of the UE 120, or any other component(s) of FIG. 2 may perform one or more techniques associated with a Tx power violation protection mechanism in an RU of a disaggregated base station, as described in more detail elsewhere herein. In some aspects, the RU or the DU described herein is the base station 110, is included in the base station 110, or includes one or more components of the base station 110 shown in FIG. 2. For example, the controller/processor 240 of the base station 110, the controller/processor 280 of the UE 120, or any other component(s) (or combinations of components) of FIG. 2 may perform or direct operations of, for example, process 500 of FIG. 5 or other processes as described herein. The memory 242 and the memory 282 may store data and program codes for the base station 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 500 of FIG. 5 or other processes as described herein. In some examples, executing instructions may include running the instructions, converting the instructions, compiling the instructions, or interpreting the instructions.

In some aspects, the base station 110 (for example, an RU associated with the base station 110) includes means for receiving, from a DU via a fronthaul interface, one or more frequency domain samples; means for performing an energy estimation measurement associated with transmitting, over an air interface, one or more time domain samples that correspond to the one or more frequency domain samples based on control information associated with the one or more frequency domain samples; or means for providing, to the DU via the fronthaul interface, one or more system alarms to indicate a transmit power violation based on the energy estimation measurement failing to satisfy one or more thresholds. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
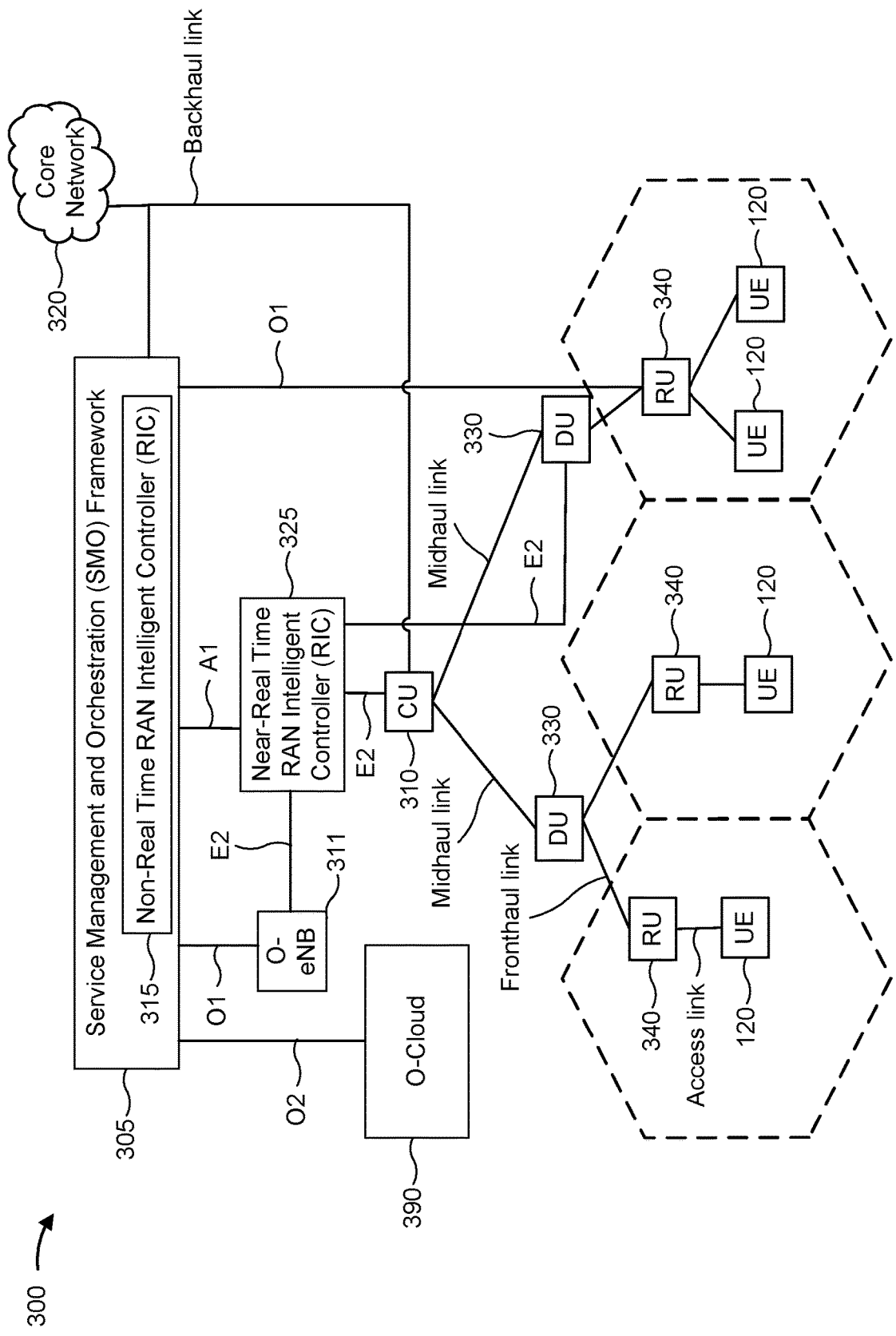
FIG. 3 is a diagram illustrating an example of a disaggregated base station architecture.

FIG. 3 is a diagram illustrating an example 300 of a disaggregated base station architecture.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links, which may be referred to herein as an air interface. In some aspects, the UE 120 may be simultaneously served by multiple RUs 340.

Each of the units (for example, the CUs 310, the DUs 330, and the RUs 340), as well as the Near-RT RICs 325, the Non-RT RICs 315, and the SMO Framework 305, may include one or more interfaces or may be coupled to one or more interfaces configured to receive, transmit, or otherwise communicate signals, data, or information (collectively, signals) via a wired transmission medium or a wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface (for example, an air interface), which may include a receiver, a transmitter, or a transceiver (such as an RF transceiver) configured to receive signals, transmit signals, or both, over a wireless transmission medium to one or more of the other units.

In some aspects, the CU 310 may host one or more higher layer control functions. Such control functions can include radio resource control (RRC), packet data convergence protocol (PDCP), or service data adaptation protocol (SDAP). Each control function can be implemented with an interface configured to communicate signals with other control functions hosted by the CU 310. The CU 310 may be configured to handle user-plane functionality (for example, Central Unit-User Plane (CU-UP)), control-plane functionality (for example, Central Unit-Control Plane (CU-CP)), or a combination thereof. In some aspects, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, or modulation and demodulation) based on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, or physical random access channel (PRACH) extraction and filtering), or both, based on the functional split, such as a lower layer functional split. In such an architecture, the RU(s) 340 can be implemented to handle over-the-air (OTA) communication with one or more UEs 120. In some aspects, real-time and non-real-time aspects of control and user-plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some aspects, the SMO Framework 305 can communicate with a hardware aspect of a 4G RAN, such as an open eNB (O-eNB) 311, via an O1 interface. Additionally, in some aspects, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some aspects, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
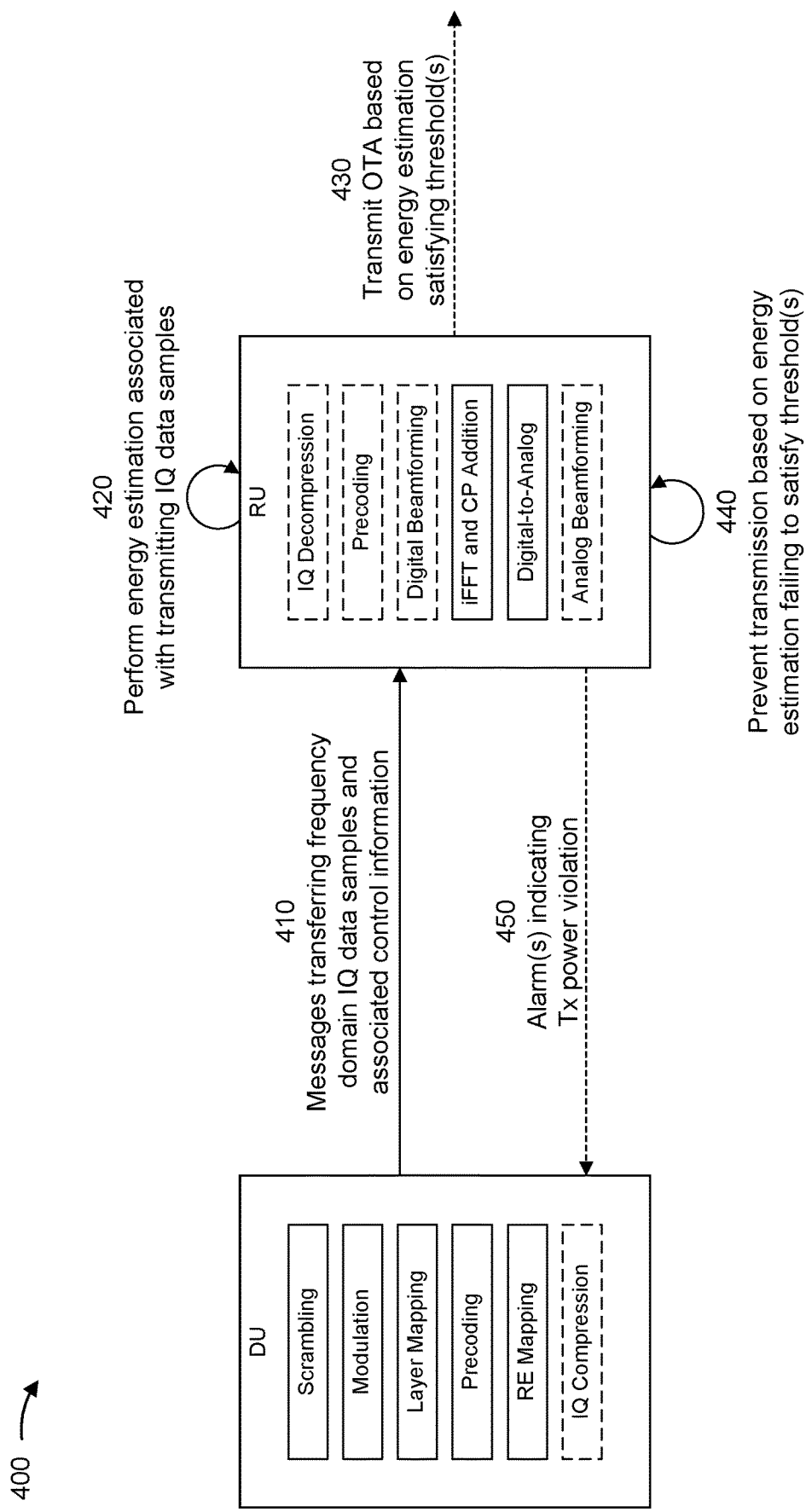
FIG. 4 is a diagram illustrating an example associated with a transmit (Tx) power violation protection mechanism in a radio unit (RU) of a disaggregated base station.

FIG. 4 is a diagram illustrating an example 400 associated with a Tx power violation protection mechanism in an RU of a disaggregated base station. As shown in FIG. 4, example 400 includes a DU and an RU that communicate over a fronthaul link (for example, the DU and the RU are associated with a disaggregated base station architecture, such as an O-RAN architecture). For example, as shown in FIG. 4, the DU and the RU may be associated with a downlink functional split in which the RU contains hardware components (for example, radio hardware) that implements lower PHY functions such as performing an iFFT, cyclic prefix addition, or digital or analog beamforming, among other examples, and further in which the DU that controls the RU implements higher PHY functions such as RE mapping, precoding, layer mapping, modulation, rate matching, and coding, among other examples.

As shown in FIG. 4, and by reference number 410, the DU may communicate one or more messages to the RU over the fronthaul interface to transfer frequency domain IQ samples and associated control information to the RU. In some aspects, the messages communicated from the DU to the RU over the fronthaul interface may use the enhanced common public radio interface (eCPRI) protocol, the Institute of Electrical and Electronics Engineers (IEEE) Standard for Radio over Ethernet Encapsulations and Mappings, or another suitable protocol as an encapsulation mechanism for user-plane messages that carry downlink user-plane data (for example, frequency domain IQ samples corresponding to a PDCCH or a PDSCH). For example, when controlling downlink transmit functions of the RU, the DU may generate the frequency domain IQ data samples and transfer the frequency domain IQ data samples to the RU symbol-by-symbol as user-plane messages. Furthermore, control information associated with the frequency domain IQ data samples may be carried in a control-plane message that is transmitted in a physically separate frame from the user-plane message(s) that carry the frequency domain IQ data samples. For example, in some aspects, a control-plane message communicated from the DU to the RU in slot n may carry control information for frequency domain IQ data samples that are communicated from the DU to the RU in slot n+1.

In some aspects, the control information that is communicated from the DU to the RU may generally include scheduling information and beamforming commands to control operation of the RU. For example, the control information communicated from the DU to the RU may include scheduling information for the frequency domain IQ samples to be transferred in the one or more user-plane messages, information indicating an FFT size, a cyclic prefix length, or a subcarrier spacing, downlink beamforming commands including a beam index and beamforming weights to be applied by the RU, or power information such as a reference input power level for the frequency domain IQ samples transferred from the DU to the RU and a Tx output power to be used by the RU. Accordingly, in some aspects, the RU may generally perform an iFFT to convert the IQ data samples from the frequency domain to the time domain, and may perform digital power scaling to set a gain lineup to achieve a downlink gain defined by a difference between the reference input power level for the frequency domain IQ samples transferred from the DU to the RU and the required Tx output power.

In general, as described herein, the DU is responsible for scaling the reference input power level of the frequency domain IQ data samples that are sent over the fronthaul interface to avoid saturation, clipping, distortion, or other adverse signal processing issues in the RU. However, there are various circumstances in which the DU may send data that will lead to signal saturation, clipping, or distortion at the RU. For example, signal saturation, clipping, or distortion may occur in cases where the DU sends the frequency domain IQ data samples with a reference input power level that exceeds a capability of the RU or an expected value that was indicated in the control information or the DU misconfigures the beamforming weights. Accordingly, to avoid destructive implications such as degrading an EVM for a signal transmitted by the RU, causing out-of-band emissions that may increase an ACLR or otherwise violate one or more requirements associated with transmitting over the air interface, or a risk of physical damage to the hardware components of the RU (for example, the power amplifier), the RU may employ a Tx power violation protection mechanism to detect and prevent conditions that may lead to signal saturation, clipping, or distortion.

For example, as shown in FIG. 4, and by reference number 420, the RU may perform an energy estimation to obtain an energy estimation measurement associated with transmitting the IQ data samples. For example, in some aspects, the RU may be equipped with capabilities to perform an FFT energy estimation in a frequency domain (for example, an amplitude spectrum or energy spectral density for the frequency domain IQ data samples received from the DU) and may continuously monitor the energy estimation measurements to determine whether a Tx power violation has occurred. Additionally, or alternatively, the RU may perform the energy estimation measurement based on control information associated with the frequency domain IQ samples, such as the beamforming weights to be used by the RU, the reference input power level, or the required output Tx power, among other examples. Furthermore, in cases where the RU includes multiple Tx ports and/or multiple Tx antennas, the RU may obtain separate energy estimation measurements associated with each Tx port and/or Tx antenna to determine whether a Tx power violation has occurred on a per-Tx port and/or a per-Tx antenna basis.

Accordingly, one or more thresholds may be defined based on power levels or energy estimation measurements that are likely to or have the potential to cause degraded signal quality, out-of-band emissions, physical hardware damage, or other adverse or destructive impacts on a signal that the RU is to transmit over the air interface, and the RU may compare the energy estimation measurement(s) to the threshold(s) to detect and prevent such Tx power violations. For example, in some aspects, the one or more thresholds may include one or more minor thresholds that define Tx power violations that do not cause a significant risk of hardware damage or failure to comply with requirements of the air interface (for example, a maximum ACLR), where the RU may transmit over the air interface even if the energy estimation measurement fails to satisfy the one or more minor thresholds. Furthermore, in some aspects, the one or more thresholds may include one or more major thresholds that define Tx power violations that are associated with a significant risk of hardware damage or failure to comply with requirements of the air interface, where the RU may prevent transmission over the air interface if the energy estimation measurement fails to satisfy the one or more major thresholds. Accordingly, as described herein, the RU may continuously monitor the energy estimation measurements for the frequency domain IQ data samples transferred from the DU to determine whether to scale a gain lineup to transmit time domain IQ data samples that correspond to the frequency domain IQ data samples (for example, after an iFFT is applied to the frequency domain IQ data samples) or prevent transmission of the time domain IQ data samples that correspond to the frequency domain IQ data samples.

In particular, as shown in FIG. 4, and by reference number 430, the RU may apply the necessary downlink gain to scale the power level from the reference input power level to the required Tx output power level and transmit a signal over the air interface (for example, to one or more connected UEs) based on the energy estimation measurement satisfying one or more thresholds. For example, in cases where the energy estimation measurement satisfies (for example, does not equal or exceed) any of the one or more thresholds that define power levels that may cause signal saturation, clipping, distortion, degraded signal quality, out-of-band emissions, or hardware damage, the RU may apply the necessary downlink gain and transmit over the air interface in a normal manner. Additionally, or alternatively, the RU may apply the necessary downlink gain and transmit over the air interface in cases where the energy estimation measurement satisfies (for example, does not equal or exceed) any of the one or more major thresholds that are associated with potential hardware damage or a risk of violating out-of-band emission requirements (for example, transmission over the air interface may be permitted if the energy estimation measurement fails to satisfy one or more minor thresholds provided that the energy estimation measurement satisfies the one or more major thresholds). Alternatively, as shown by reference number 440, the RU may prevent transmission over the air interface in cases where the energy estimation measurement fails to satisfy the one or more major thresholds. For example, in cases where the RU detects that one or more symbols fail to satisfy (for example, equal or exceed) the one or more major thresholds, the RU may prevent transmission of the corresponding port or carrier to avoid the potential adverse consequences of the high power level. Furthermore, in cases where the RU includes multiple Tx ports and/or multiple Tx antennas, the RU may determine whether to transmit the appropriate signal over the air interface or prevent transmission on a per-port or per-antenna basis (for example, based on whether the energy estimation measurement associated with a particular port satisfies or fails to satisfy the minor and/or major thresholds).

In some aspects, as shown in FIG. 4, and by reference number 450, the RU may provide, to the DU via the fronthaul interface, one or more system alarms to indicate when one or more Tx power violations are detected. For example, in some aspects, the one or more system alarms may be provided in cases where the energy estimation measurement performed at the RU resulted in a minor power violation (for example, a failure to satisfy a minor threshold only) or a major power violation (for example, a failure to satisfy a major threshold). The DU may then use the one or more system alarms to attempt to diagnose or remediate a condition that may have caused the Tx power violation(s) (for example, adjusting the beamforming weights to be used at the RU or reducing the reference input power level or Tx output power level). Furthermore, as described herein, the system alarms may be activated and sent to the DU on a per-port or per-antenna basis when the RU has multiple Tx ports or multiple Tx antennas. For example, in such cases, the RU may send information to the DU to indicate that a Tx power violation or other suitable error event occurred on a particular Tx port and/or a particular Tx antenna (for example, to enable the DU to adjust beamforming weights, the reference input power level, the Tx output power level, and/or other suitable transmission parameters on a per-port or per-antenna basis).

Figure 5:
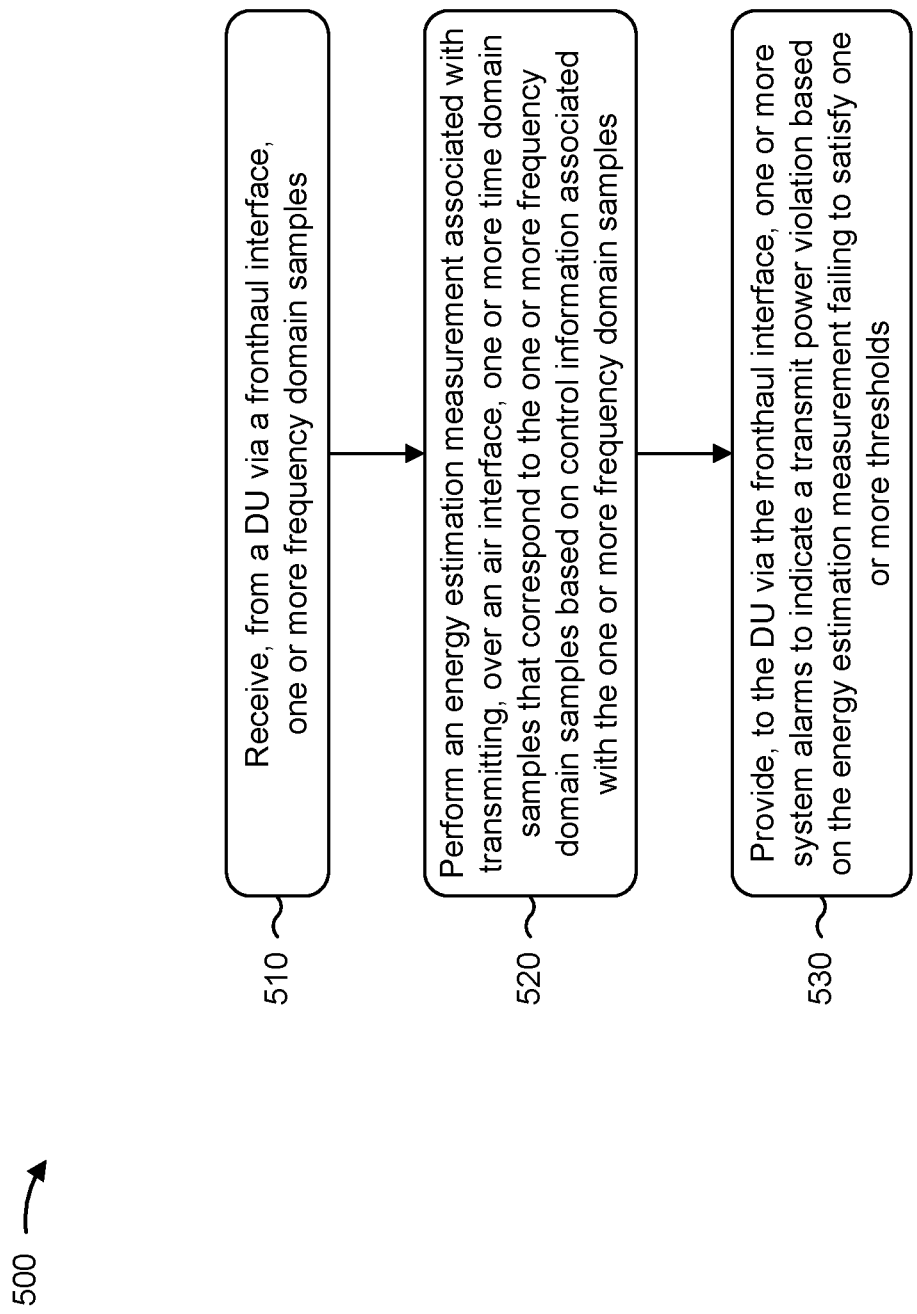
FIG. 5 is a diagram illustrating an example process performed, for example, by an RU of a disaggregated base station.

FIG. 5 is a diagram illustrating an example process 500 performed, for example, by an apparatus of an RU. The process 500 is an example where the apparatus of the RU (for example, an apparatus of the RU 340 or the base station 110) performs operations associated with a Tx power violation protection mechanism.

As shown in FIG. 5, in some aspects, the process 500 may include receiving, from a DU via a fronthaul interface, one or more frequency domain samples (block 510). For example, the apparatus of an RU (such as by using communication manager 150 or reception component 602, depicted in FIG. 6) may receive, from a DU via a fronthaul interface, one or more frequency domain samples.

As further shown in FIG. 5, in some aspects, the process 500 may include performing an energy estimation measurement associated with transmitting, over an air interface, one or more time domain samples that correspond to the one or more frequency domain samples based on control information associated with the one or more frequency domain samples (block 520). For example, the apparatus of the RU (such as by using communication manager 150 or energy estimation component 608, depicted in FIG. 6) may perform an energy estimation measurement associated with transmitting, over an air interface, one or more time domain samples that correspond to the one or more frequency domain samples based on control information associated with the one or more frequency domain samples.

As further shown in FIG. 5, in some aspects, the process 500 may include providing, to the DU via the fronthaul interface, one or more system alarms to indicate a transmit power violation based on the energy estimation measurement failing to satisfy one or more thresholds (block 530). For example, the apparatus of the RU (such as by using communication manager 150, transmission component 604, or Tx power violation protection component 610, depicted in FIG. 6) may provide, to the DU via the fronthaul interface, one or more system alarms to indicate a transmit power violation based on the energy estimation measurement failing to satisfy one or more thresholds.

The process 500 may include additional aspects, such as any single aspect or any combination of aspects described in connection with the process 500 or in connection with one or more other processes described elsewhere herein.

In a first additional aspect, the control information associated with the one or more frequency domain samples includes a reference input power level.

In a second additional aspect, alone or in combination with the first aspect, the control information associated with the one or more frequency domain samples includes beamforming weights to be used to transmit the one or more time domain samples.

In a third additional aspect, alone or in combination with one or more of the first and second aspects, the energy estimation measurement is based on a reference input power level and a required transmit antenna power to transmit the one or more time domain samples over the air interface.

In a fourth additional aspect, alone or in combination with one or more of the first through third aspects, the one or more thresholds are based on one or more transmit antenna power levels that cause signal saturation or clipping at the RU.

In a fifth additional aspect, alone or in combination with one or more of the first through fourth aspects, the one or more thresholds include at least one minor threshold associated with raising the one or more system alarms and at least one major threshold associated with preventing transmission of the one or more time domain samples in addition to raising the one or more system alarms.

In a sixth additional aspect, alone or in combination with one or more of the first through fifth aspects, the process 500 includes transmitting the one or more time domain samples over the air interface based on the energy estimation measurement failing to satisfy the at least one minor threshold and satisfying the at least one major threshold.

In a seventh additional aspect, alone or in combination with one or more of the first through sixth aspects, the process 500 includes preventing transmission of the one or more time domain samples over the air interface based on the energy estimation measurement failing to satisfy the at least one minor threshold and failing to satisfy the at least one major threshold.

Although FIG. 5 shows example blocks of the process 500, in some aspects, the process 500 may include additional blocks, fewer blocks, different blocks, or differently arranged blocks than those depicted in FIG. 5. Additionally, or alternatively, two or more of the blocks of the process 500 may be performed in parallel.

Figure 6:
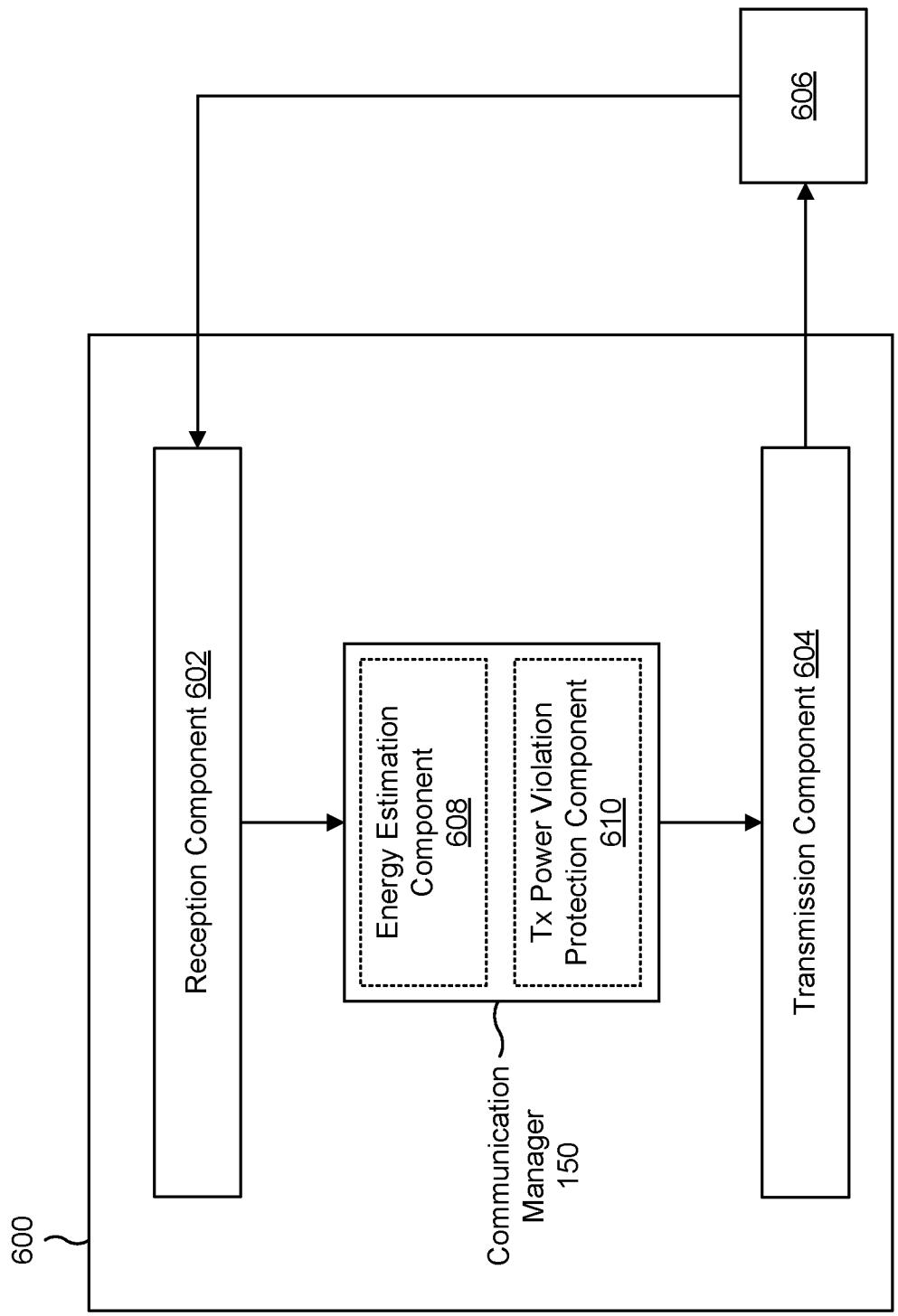
FIG. 6 is a diagram of an example apparatus for wireless communication.

FIG. 6 is a diagram of an example apparatus 600 for wireless communication. The apparatus 600 may be a RU, or a RU may include the apparatus 600. In some aspects, the apparatus 600 includes a reception component 602 and a transmission component 604, which may be in communication with one another (for example, via one or more buses or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 150. The communication manager 150) may include one or more of an energy estimation component 608 or a Tx power violation protection component 610, among other examples.

In some aspects, the apparatus 600 may be configured to perform one or more operations described herein in connection with FIG. 4. Additionally, or alternatively, the apparatus 600 may be configured to perform one or more processes described herein, such as process 500 of FIG. 5. In some aspects, the apparatus 600 or one or more components shown in FIG. 6 may include one or more components of the RU described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the RU described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the RU described in connection with FIG. 2. In some aspects, the transmission component 604 may be co-located with the reception component 602 in a transceiver.

The reception component 602 may receive, from a DU via a fronthaul interface, one or more frequency domain samples. The energy estimation component 608 may perform an energy estimation measurement associated with transmitting, over an air interface, one or more time domain samples that correspond to the one or more frequency domain samples based on control information associated with the one or more frequency domain samples. The transmission component 604 or the Tx power violation protection component 610 may provide, to the DU via the fronthaul interface, one or more system alarms to indicate a transmit power violation based on the energy estimation measurement failing to satisfy one or more thresholds.

The transmission component 604 may transmit the one or more time domain samples over the air interface based on the energy estimation measurement failing to satisfy the at least one minor threshold and satisfying the at least one major threshold.

The Tx power violation protection component 610 may prevent transmission of the one or more time domain samples over the air interface based on the energy estimation measurement failing to satisfy the at least one minor threshold and failing to satisfy the at least one major threshold.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by an apparatus of an RU, comprising: receiving, from a DU via a fronthaul interface, one or more frequency domain samples; performing an energy estimation measurement associated with transmitting, over an air interface, one or more time domain samples that correspond to the one or more frequency domain samples based on control information associated with the one or more frequency domain samples; and providing, to the DU via the fronthaul interface, one or more system alarms to indicate a transmit power violation based on the energy estimation measurement failing to satisfy one or more thresholds.

Aspect 2: The method of Aspect 1, wherein the control information associated with the one or more frequency domain samples includes a reference input power level.

Aspect 3: The method of any of Aspects 1-2, wherein the control information associated with the one or more frequency domain samples includes beamforming weights to be used to transmit the one or more time domain samples.

Aspect 4: The method of any of Aspects 1-3, wherein the energy estimation measurement is based on a reference input power level and a required transmit antenna power to transmit the one or more time domain samples over the air interface.

Aspect 5: The method of any of Aspects 1-4, wherein the one or more thresholds are based on one or more transmit antenna power levels that cause signal saturation or clipping at the RU.

Aspect 6: The method of any of Aspects 1-5, wherein the one or more thresholds include at least one minor threshold associated with raising the one or more system alarms and at least one major threshold associated with preventing transmission of the one or more time domain samples in addition to raising the one or more system alarms.

Aspect 7: The method of Aspect 6, further comprising: transmitting the one or more time domain samples over the air interface based on the energy estimation measurement failing to satisfy the at least one minor threshold and satisfying the at least one major threshold.

Aspect 8: The method of Aspect 6, further comprising: preventing transmission of the one or more time domain samples over the air interface based on the energy estimation measurement failing to satisfy the at least one minor threshold and failing to satisfy the at least one major threshold.

Aspect 9: An apparatus for wireless communication at a device, comprising a processor; memory coupled with the processor; and instructions stored in the memory and executable by the processor to cause the apparatus to perform the method of one or more of Aspects 1-8.

Aspect 10: A device for wireless communication, comprising a memory and one or more processors coupled to the memory, the one or more processors configured to perform the method of one or more of Aspects 1-8.

Aspect 11: An apparatus for wireless communication, comprising at least one means for performing the method of one or more of Aspects 1-8.

Aspect 12: A non-transitory computer-readable medium storing code for wireless communication, the code comprising instructions executable by a processor to perform the method of one or more of Aspects 1-8.

Aspect 13: A non-transitory computer-readable medium storing a set of instructions for wireless communication, the set of instructions comprising one or more instructions that, when executed by one or more processors of a device, cause the device to perform the method of one or more of Aspects 1-8.

The foregoing disclosure provides illustration and description but is not intended to be exhaustive or to limit the aspects to the precise forms disclosed. Modifications and variations may be made in light of the disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a radio unit (RU), comprising:
   receiving, from a distributed unit (DU) via a fronthaul interface, one or more frequency domain samples;
   performing an energy estimation measurement associated with transmitting, over an air interface, one or more time domain samples that correspond to the one or more frequency domain samples based on control information associated with the one or more frequency domain samples; and
   providing, to the DU via the fronthaul interface, one or more system alarms to indicate a transmit power violation based on the energy estimation measurement failing to satisfy one or more thresholds.

2. The method of claim 1, wherein the control information associated with the one or more frequency domain samples includes a reference input power level.

3. The method of claim 1, wherein the control information associated with the one or more frequency domain samples includes beamforming weights to be used to transmit the one or more time domain samples.

4. The method of claim 1, wherein the energy estimation measurement is based on a reference input power level and a required transmit antenna power to transmit the one or more time domain samples over the air interface.

5. The method of claim 1, wherein the one or more thresholds are based on one or more transmit antenna power levels that cause signal saturation or clipping at the RU.

6. The method of claim 1, wherein the one or more thresholds include at least one minor threshold associated with raising the one or more system alarms and at least one major threshold associated with preventing transmission of the one or more time domain samples in addition to raising the one or more system alarms.

7. The method of claim 6, further comprising:
   transmitting the one or more time domain samples over the air interface based on the energy estimation measurement failing to satisfy the at least one minor threshold and satisfying the at least one major threshold.

8. The method of claim 6, further comprising:
   preventing transmission of the one or more time domain samples over the air interface based on the energy estimation measurement failing to satisfy the at least one minor threshold and failing to satisfy the at least one major threshold.

9. An apparatus of a radio unit (RU) for wireless communication, comprising:
   a first interface configured to obtain, from a distributed unit (DU), one or more frequency domain samples; and
   a processing system configured to perform an energy estimation measurement associated with transmitting, over a second interface, one or more time domain samples that correspond to the one or more frequency domain samples based on control information associated with the one or more frequency domain samples,
   wherein the first interface is configured to output, to the DU, one or more system alarms to indicate a transmit power violation based on the energy estimation measurement failing to satisfy one or more thresholds.

10. The apparatus of claim 9, wherein the control information associated with the one or more frequency domain samples includes a reference input power level.

11. The apparatus of claim 9, wherein the control information associated with the one or more frequency domain samples includes beamforming weights to be used to transmit the one or more time domain samples.

12. The apparatus of claim 9, wherein the energy estimation measurement is based on a reference input power level and a required transmit antenna power to transmit the one or more time domain samples over the second interface.

13. The apparatus of claim 9, wherein the one or more thresholds are based on one or more transmit antenna power levels that cause signal saturation or clipping at the RU.

14. The apparatus of claim 9, wherein the one or more thresholds include at least one minor threshold associated with raising the one or more system alarms and at least one major threshold associated with preventing transmission of the one or more time domain samples in addition to raising the one or more system alarms.

15. The apparatus of claim 14, further comprising:
   a second interface configured to output the one or more time domain samples based on the energy estimation measurement failing to satisfy the at least one minor threshold and satisfying the at least one major threshold.

16. The apparatus of claim 14, wherein the processing system is configured to prevent transmission of the one or more time domain samples over the second interface based on the energy estimation measurement failing to satisfy the at least one minor threshold and failing to satisfy the at least one major threshold.

17. A non-transitory computer-readable medium storing a set of instructions for wireless communication, the set of instructions comprising:
   one or more instructions that, when executed by one or more processors of a radio unit (RU), cause the radio unit to:
      receive, from a distributed unit (DU) via a fronthaul interface, one or more frequency domain samples;
      perform an energy estimation measurement associated with transmitting, over an air interface, one or more time domain samples that correspond to the one or more frequency domain samples based on control information associated with the one or more frequency domain samples; and
      provide, to the DU via the fronthaul interface, one or more system alarms to indicate a transmit power violation based on the energy estimation measurement failing to satisfy one or more thresholds.

18. The non-transitory computer-readable medium of claim 17, wherein the one or more thresholds are based on one or more transmit antenna power levels that cause signal saturation or clipping at the RU.

19. The non-transitory computer-readable medium of claim 17, wherein the one or more instructions further cause the RU to:
   transmit the one or more time domain samples over the air interface based on the energy estimation measurement failing to satisfy at least one minor threshold and satisfying at least one major threshold.

20. The non-transitory computer-readable medium of claim 17, wherein the one or more instructions further cause the RU to:
   prevent transmission of the one or more time domain samples over the air interface based on the energy estimation measurement failing to satisfy at least one minor threshold and failing to satisfy at least one major threshold.

* * * * *